United States Patent [19]

Berg

[11] 4,149,560

[45] Apr. 17, 1979

[54] BRAKE BLEEDER VALVE

[76] Inventor: Allen L. Berg, 61 E. Maryland Ave., Saint Paul, Minn. 55117

[21] Appl. No.: 785,212

[22] Filed: Apr. 6, 1977

[51] Int. Cl.² ............................................. F16K 15/02
[52] U.S. Cl. ................................ 137/543.21; 137/351; 251/150; 188/352
[58] Field of Search .................... 137/540, 543.21, 351; 188/352; 251/150

[56] References Cited

U.S. PATENT DOCUMENTS

| 2,009,433 | 7/1935 | Carroll | 188/352 X |
| 2,611,387 | 9/1952 | Legerski | 188/352 X |
| 2,752,942 | 7/1956 | Trevaskis | 137/543.21 X |
| 2,771,093 | 11/1956 | Wilson | 188/352 X |
| 2,918,083 | 12/1959 | Clark, Jr. et al. | 137/543.21 X |
| 3,802,461 | 4/1974 | Witt | 137/843 |
| 3,809,359 | 5/1974 | Truelove, Sr. | 188/352 X |

FOREIGN PATENT DOCUMENTS 71545 7/1959 France ................................ 137/543.21

*Primary Examiner*—William R. Cline
*Attorney, Agent, or Firm*—Norman P. Friederichs

[57] ABSTRACT

A one-way valve is provided which may be releasibly attached to a wheel brake cylinder of an automobile for bleeding the brake system of any air existing in such system. The bleeder valve has a quick disconnect which may be snapped over the bleeder outlet in sealing engagement therewith.

6 Claims, 3 Drawing Figures

U.S. Patent
Apr. 17, 1979
4,149,560
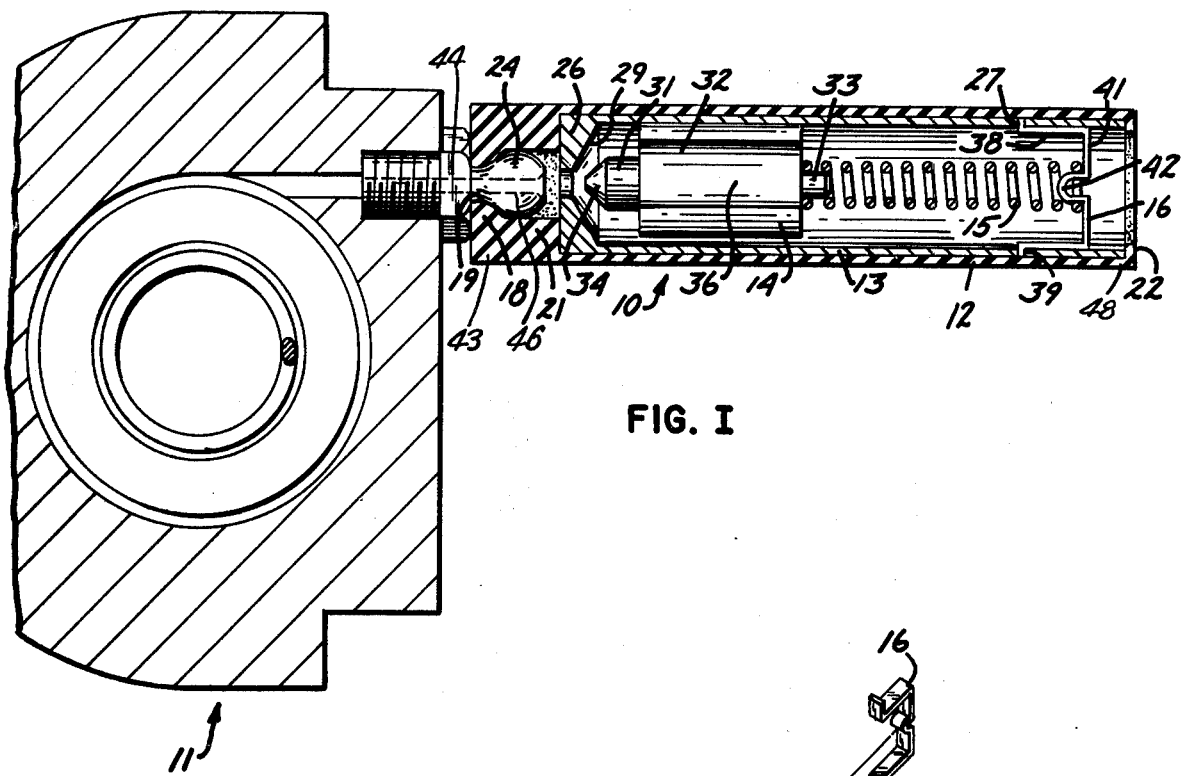
FIG. I
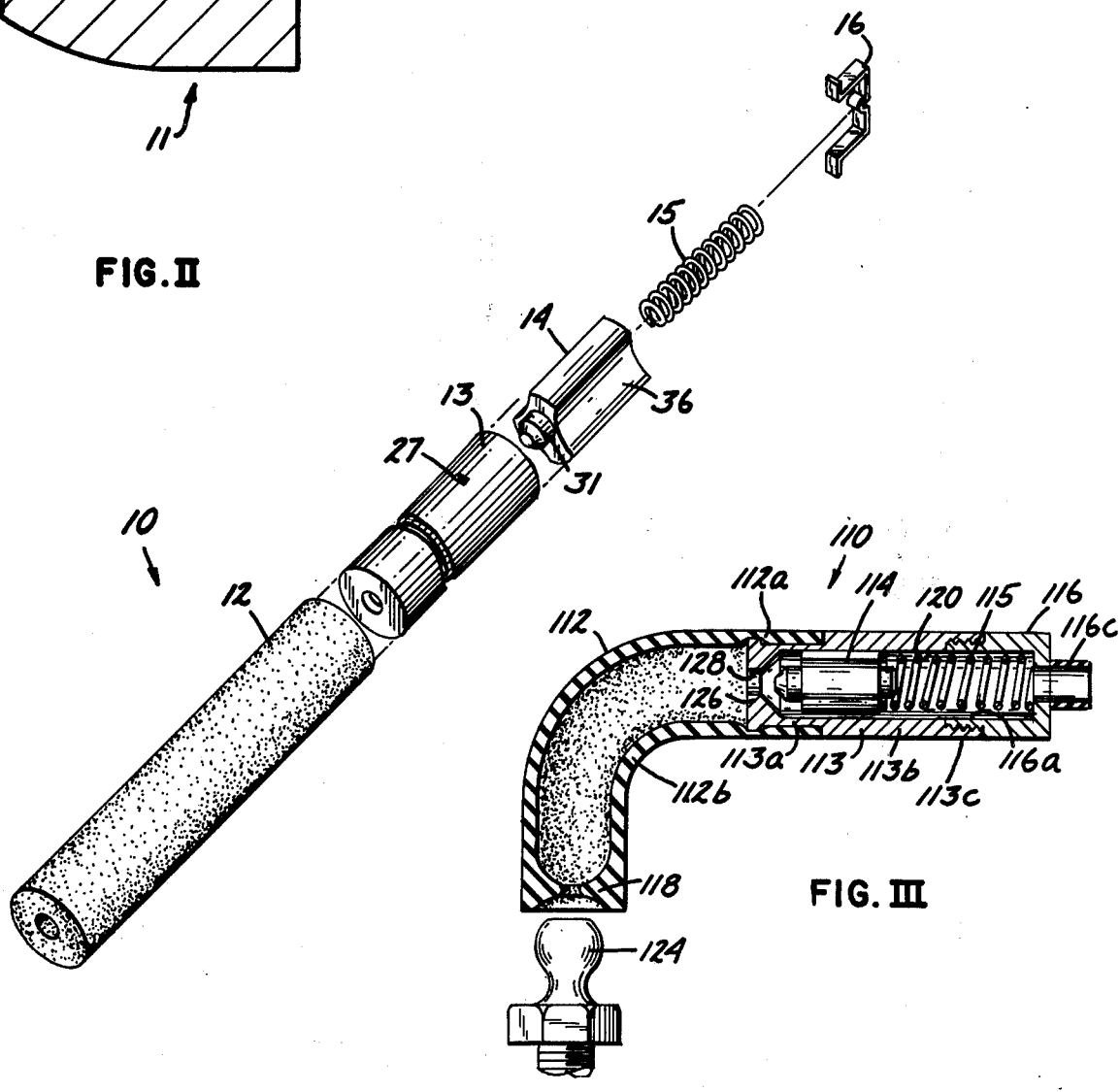
FIG. II
FIG. III

BRAKE BLEEDER VALVE

BACKGROUND OF THE INVENTION

The present invention relates to valves and more particularly to one-way valves for draining entrapped air or gases from a vehicle hydraulic brake system.

It is not at all uncommon for the hydraulic brake system of an automobile to acquire a pocket of air. Typically, such air enters the hydraulic system when a leak develops either in the wheel cylinders or in the master cylinder and brake fluid is lost. Once the fluid level is lowered to a certain level, the master cylinder draws or pushes air into the hydraulic lines. The air accumulates in the wheel cylinders and the hydraulic system becomes ineffective. The air may be induced into the system when the master cylinder or wheel cylinders are rebuilt or replaced. In any case, when the air accumulates in the hydraulic system, it must be removed, otherwise the brakes will fail.

Bleeding of brake systems has in the past required either that two persons be present or else that one person repeatedly get in and out of the automobile. Wheel brake cylinders have a rotatable valve which is alternately rotated between a closed position and an open position during bleeding of a brake system. To remove air from the system the rotatable valve is opened and the brake peddle is depressed, creating pressure within the system thereby pushing air and/or brake fluid through the open rotatable valve. However, if the brake peddle is permitted to rise, without closing the valve, air is drawn back into the wheel cylinder and the purpose is defeated. If, on the other hand, the valve is opened, the peddle is depressed, the rotatable valve is closed, and the peddle returned to the upper position, a portion of air is effectively removed from the system. Thus, to bleed an automobile hydraulic brake system, the cycle of opening the rotatable valve, depressing the foot peddle, closing the rotatable valve, raising the foot peddle, opening the rotatable valve, depressing the foot peddle and again closing the rotatable valve has been necessary in order to bleed a brake system. In so doing, either two people must be present one operating the foot peddle, the other operating the rotatable valve or alternatively, one person must repeatedly move from the position of operating the rotatable valve and the position of depressing or raising the foot peddle. Such an approach for bleeding a brake system is time consuming and bothersome.

Some attempts have been made to overcome such problem. Some attempts have been directed toward including a permanently mounted one-way valve on the hydraulic cylinders. Certain problems have been encountered with such permanently mounted one-way valves. For example, such permanently mounted valves may accumulate foreign material over a period of time and thus remain closed when they are supposed to open or remain open when they are supposed to close. This necessitates disassembly of the wheel cylinder and replacement of the valve mechanism. Moreover, such permanently mounted valves are not adapted for ready attachment to existing hydraulic systems which have not been provided with such valving as original equipment. Illustrations of such permanently mounted valves are those shown in U.S. Pat. Nos. 2,046,228, 2,064,573, 2,069,606, 2,502,050 and 2,771,083.

SUMMARY OF THE PRESENT INVENTION

The present invention is a portable one-way valve which may be quickly and easily attached and detached from an automobile wheel brake cylinder. The valve is used for bleeding air from the hydraulic system. The portable valve may be utilized by opening the wheel brake cylinder bleeder outlet valve and snapping the valve into sealing engagement with the bleeder outlet. With the valve in place, the hydraulic system may be bled by simply pumping the brake peddle up and down until the air is removed from such cylinder. Of course, one must be certain that adequate fluid is added to the master cylinder during the bleeding process.

The present portable one-way valve may include an outer casing or jacket in the form of an elongated cylinder. The jacket cylinder may be of rubber or resiliently flexible material. The valve has a quick disconnect at the upstream end suitable for snapping into sealing attachment with the bleeder outlet. The valve has a valve seat and a plunger or needle which cooperates with the valve seat to permit passage of fluids such as air and/or brake fluid in only one direction. The plunger may be urged toward the valve seat by a coil spring. Although various modifications may be made to such valve, it is essential that the valve be provided with a quick disconnect typically a resilient ring.

IN THE DRAWINGS

FIG. I is a cross-sectional view including a hydraulic wheel brake cylinder and a cross-sectional view of the present one-way valve;

FIG. II is an exploded view showing the various parts of the one-way valve.

FIG. III is a cross-sectional view of an alternate embodiment.

DETAILED DESCRIPTION OF THE PRESENT INVENTION

The bleeder valve 10 of the present invention, one preferred embodiment of which is shown in FIGS. I and II, is adapted for use in conjunction with a hydraulic brake cylinder 11 for purposes of bleeding or removing entrapped air from the hydraulic system. The brake bleeder valve 10 may include a shell or outer jacket 12, a valve seat body 13, a needle or plunger 14, a spring 15 and a spring clip or keeper 16.

The jacket may be constructed of a tubular rubber or elastic material and may include a thickened portion 18 defining a central opening or inlet 19. The jacket 12 may include a thickened portion 21 which serves to retain the valve seat body 13 spaced from the inlet portion 18. The jacket 12 further includes a thickened portion 22 adjacent the outlet or downstream end of the jacket 12. The outer jacket 12, including the thickened portions 18, 21 and 22 may be formed by molding. The portions 18 and 22 desirably are of a resilient material such as rubber. The thickened portion 18 is of a size appropriate to snuggly and sealingly engage a bleeder outlet valve 24.

The valve seat body 13 is a tubular structure including a thickened portion 26 and a slot 27. The thickened portion 26 serves as the valve seat. Portion 26 may include a central opening 28 and desirably has a tapered downstream surface 29. The slot 27 serves to retain spring keeper 16 properly in place. The outside diameter of valve seat body 13 closely approximates the internal diameter of jacket 12, such that body 13 may be inserted into and retained within the jacket 12. The outside diameter of body 13 is sufficiently greater than the internal diameter of rings 21 and 22 to retain valve seat body 13 in the proper location within the jacket 12.

The plunger 14 may include a slender portion 31, a guide portion 32 and a spring keeper portion 33. The portion 31 serves as a needle for sealing or closing engagement with the valve seat 26. The portion 31 may have a tapered or conical surface 34 which cooperates with the tapered surface 29 of the valve seat. The portion 32 serves as a guide as the plunger 14 moves within valve seat body 13. For this reason, the diameter of portion 32 approximates but is slightly smaller than the internal diameter of valve seat body 13 thereby providing easy movement of plunger 14 within body 13. The portion 32 may include a plurality of channels 36 which serve as by-pass for air and/or fluid around plunger 14 when the valve 10 is open. The portion 33 of plunger 14 is for engagement with the end of spring 15 and assists in maintaining the spring 15 and plunger 14 in proper alignment. The diameter of portion 33 desirably approximates the internal diamter of the upstream end of spring 15 such that the spring may overlie and frictionally engage such portion.

The spring 15 may be a coil spring constructed of steel and may have an outside diameter somewhat smaller than the internal diameter of valve seat body 13, so that spring 15 may be easily inserted into the body 13 and may suitably operate therein. The spring 15 may be of conventional coil spring construction.

The spring keeper 16 has a body portion 38, a radially outwardly extending flange portion 39, a radially inwardly extending portion 41, and an inner portion 42. The flange portion 39 is of appropriate size for reception in slot 27 of valve seat body 13 which holds keeper 16 in place. The inner portion 42 is of appropriate size for reception in one end of spring 15.

ASSEMBLY OF THE INVENTION

The valve 10 may be assembled by inserting plunger 14 into valve seat body 13. Spring 15 is next inserted and spring keeper 16 is locked in place with flange 39 engaged in slot 27 thereby forming a subassembly. The valve seat body 13 or keeper 16 may be capable of slight deformation to permit entrance of keeper 16 therein. The spring 15 is engaged with portion 33 of plunger 14 and portion 42 of keeper 16 during assembly. Thus subassembly is then placed in jacket 12 through the upstream end. Since jacket 12 is of a resilient material, it may be stretched sufficient to permit entrance of the subassembly through thickened jacket portion 22. Once the subassembly is in place, it is entrapped between jacket portions 21 and 22.

OPERATION OF THE INVENTION

The brake bleeder valve 10 of the present invention may be utilized by releasibly attaching valve 10 to the bleeder outlet portion 24 of a hydraulic brake wheel cylinder 11. The upstream end 43 of valve 10 is abutted against the bleeder outlet 24 and then pushed toward the wheel cylinder 11 such that bleeder outlet 24 is snapped through opening 19 with the thickened portion 18 providing sealing engagement between the valve 10 and the bleeder outlet 24. The rotatable bleeder valve 44 may be rotated to an open position either immediately prior to attachment of valve 10 or following such engagement. Of course, the outlet 24 desirably should be cleaned of foreign material.

The brake peddle of the automobile is depressed and the wheel cylinder forces air and/or brake fluid through the opening 46 in rotatable valve 44. The pressure of the air and/or brake fluid forces plunger 14 from its seated position thereby permitting the air and/or brake fluid to move past plunger 14, from thence along and around spring 15 and keeper 16, thus, exiting valve 10 at downstream end 48. If desired, suitable tubing may be attached to valve 10 to permit capture of any fluid passing through valve 10. Such capture would be primarily for purposes of maintaining the work area in a clean condition since such fluid is generally not reused.

Once the pressure of the air and/or fluid subsides, spring 15 moves plunger 14 toward the seat 26, thereby sealing or closing valve 10. Once the plunger is seated, air can no longer enter bleeder outlet 24. The brake foot peddle may be returned to its uppermost position without inducing air to enter wheel cylinder 11. This cycle may be repeated as many times as is necessary to remove air from the wheel cylinder 11 without closing the rotatable bleeder valve 24. Once proper bleeding has been accomplished, rotatable valve 24 is closed and valve 10 is removed. Following use, valve 10 may be cleaned such as with a solvent and stored until it is again needed.

ALTERNATE EMBODIMENT

Another preferred bleeder valve 110 is shown in FIG. III. Bleeder valve 110 is efficient in construction and is suitable for use on any automotive hydraulic brake systems. Brake bleeder valve 110 has an added advantage in that it can be readily disassembled for purposes of cleaning the valve.

The brake bleeder 110 may include a rubber or flexible stem-jacket 112 which partially encloses a valve body 113. A needle or plunger 114, a spring 115, and a keeper 116 are contained within the valve body 113.

The rubber stem-jacket 112 may include a thickened portion 118 which serves to provide a sealing engagement with wheel cylinder bleeder outlet portion 124. The stem-jacket 112 may include a downstream portion 112a which is suitable for frictional engagement with valve body 113. The stem-jacket 112 further includes an elbow portion 112b which may be of 90 degrees and facilitates attaching the bleeder valve 110 to outlet 124 in close quarters.

The valve body 113 is a tubular structure and may be constructed of metal or plastic including a valve seat 126 with a central opening 128 therein. The valve body 113 may include a first portion 113a of reduced outside diameter, a central portion 113b and an internally threaded downstream portion 113c. The valve body 113 includes a central zone or chamber 120 suitable for reception of the needle 114 and spring 115. The spring keeper 116 has a threaded portion 116a for engagement in valve body threaded portion 113c. Keeper portion 116c has a reduced diameter suitable for frictional engagement with a tube (not shown) for carrying away the waste brake fluid.

The valve 110 may operate substantially in the same manner as previously described valve 10. In other words, the stem 112 may be snapped into engagement with brake bleeder outlet 124. The bleeder is then opened and the brake peddle depressed forcing air and/or brake fluid through the outlet 124. The brake fluid forces the needle 114 from the seat 126 thereby opening the valve 110 and permitting air and/or fluid to escape therethrough. Once the pressure from the brake cylinder subsides, the spring 115 urges needle 114 back into sealing engagement with seat 126 thereby closing off communication with the outlet 124. This process may be repeated as many times as is necessary to remove entrapped air from the hydraulic system. The bleeder outlet is then closed and the tool is removed.

What is claimed is:

1. A portable one-way valve for use in bleeding air from wheel brake cylinders on automobiles, said one-way valve comprising: elongated outer jacket means having an upstream end and a downstream end, said jacket means comprising a rubber tube; valve seat means disposed in said jacket means, said valve seat means comprising a tube including a restricted seat zone adjacent the upstream end and a clip retaining slot adjacent the downstream end; valve needle means disposed in said jacket means downstream of said valve seat means for engagement and disengagement in said valve seat means, said valve needle means comprising a plunger including a cylindrical portion suitable for closing said restricted seat zone and a guide portion for orienting said cylindrical portion toward said seat zone; means for urging said needle means toward said valve seat means, said urging means comprising a coil spring and a spring clip, said spring clip being lockingly engaged in said clip retaining slot, said coil spring having a first end which bears against said clip and a second end which bears against said guide portion to urge said cylindrical portion of said valve needle means into closing engagement with said restricted seat zone; and quick disconnect means adjacent the upstream end of said jacket means for releasibly attaching said portable one-way valve to the outlet bleeder valve member of a wheel brake cylinder, said quick disconnect means comprising a resilient ring defining an opening which is smaller in diameter than said outlet bleeder valve member, said resilient ring being deformable to sealingly receive said outlet bleeder valve member.

2. The valve of claim 1 wherein said quick disconnect means comprise a thickened portion of said rubber jacket.

3. The valve of claim 2 wherein said jacket includes a flexible stem extending from said subassembly.

4. The valve of claim 3 wherein said stem has an elbow portion.

5. The valve of claim 1 wherein said jacket encloses only a portion of said subassembly.

6. The valve of claim 1 wherein said one-way needle valve subassembly is contained entirely within said resilient outer jacket.

* * * * *